United States Patent
Levine et al.

(10) Patent No.: US 7,163,269 B2
(45) Date of Patent: Jan. 16, 2007

(54) METHODS AND SYSTEMS FOR MAINTAINING COLOR CONSISTENCY IN A PRINT-ON-DEMAND WORKFLOW

(75) Inventors: Jonathan D. Levine, Rochester, NY (US); Michael J. Evan, Webster, NY (US); Ann L. McCarthy, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 619 days.

(21) Appl. No.: 10/756,218

(22) Filed: Jan. 12, 2004

(65) Prior Publication Data

US 2005/0151981 A1   Jul. 14, 2005

(51) Int. Cl.
*B41J 29/38* (2006.01)
(52) U.S. Cl. .......................................... 347/14; 347/43
(58) Field of Classification Search ..................... None
See application file for complete search history.

(56) References Cited

U.S. PATENT DOCUMENTS

| | | | |
|---|---|---|---|
| 5,832,193 A | 11/1998 | Perine et al. ............... | 395/117 |
| 5,995,721 A | 11/1999 | Rourke et al. .............. | 395/114 |
| 6,188,487 B1 * | 2/2001 | Matsubara .................. | 358/1.15 |
| 6,417,931 B1 | 7/2002 | Mori et al. ................. | 358/1.15 |
| 2002/0061238 A1 | 5/2002 | Marsh ........................... | 412/9 |
| 2003/0140315 A1 | 7/2003 | Blumberg et al. .......... | 715/527 |

FOREIGN PATENT DOCUMENTS

WO    WO 02/01403 A1    1/2002

\* cited by examiner

*Primary Examiner*—Thinh Nguyen
(74) *Attorney, Agent, or Firm*—Kermit D. Lopez; Luis M. Ortiz; Ortiz & Lopez, PLLC (57) ABSTRACT

Methods and systems for maintaining color consistency in print-on-demand applications are disclosed. Initially, a plurality of default color settings applicable to a plurality of print-on-demand operations can be established. Thereafter, color consistency can be selectively imposed across a plurality of print-on-demand operations based on the plurality of default color settings applicable to the plurality of print-on-demand operations. Finally, a print-on-demand media product can be rendered in response to selectively imposing color consistency across the plurality of print-on-demand operations. An end-to-end print-on-demand workflow is therefore disclosed herein that describes how to create and print color books while maintaining color consistent at each step of in the work follow.

20 Claims, 6 Drawing Sheets

METHODS AND SYSTEMS FOR MAINTAINING COLOR CONSISTENCY IN A PRINT-ON-DEMAND WORKFLOW

TECHNICAL FIELD

Embodiments are generally related to print-on-demand (POD) applications, devices and techniques thereof. Embodiments are also related to techniques for incorporating color rendering into POD applications.

BACKGROUND OF THE INVENTION

Print-on-demand (POD) for books involves the on demand, printing, binding and trimming of bound books. POD is also applicable to other publications and media that require finishing. Typically, bound books comprise a stacked plurality of text pages referred to as a book block, which includes one edge that is known to as the spine. The cover is of a suitable cover stock that is generally thicker and/or heavier than the text pages comprising the book block. The cover has a front portion that overlies the front of the book block, a back portion that overlies the back of the book block, and a center portion spanning across the spine of the book block. A suitable adhesive can be applied between the spine of the book block and the inside face of the center portion of the cover. The spine of the book block (i.e., the edges of the text pages along one edge of the book block) can be imbedded in the adhesive which, upon curing, securely adheres the pages of the book block to one another and to the center portion of the cover, thereby permitting the book to be opened to any page without the pages coming loose.

In high volume production processes for manufacturing such bound books, the pages of each book block are usually jogged by specially developed machines prior to the application of adhesive so as to insure that the edges of the pages are properly aligned with one another. The adhesive, typically a suitable hot melt adhesive, is then applied to the spine of the book block. The cover, which is usually pre-printed, is then folded around the front, spine, and back of the book block and is firmly clamped to the book block proximate the spine during assembly. In this manner, the adhesive is firmly pressed between the spine of the book block and the inner face of the center portion of the cover to properly adhere the cover to the book block while simultaneously adhering the pages to one another.

Typically, bound books are printed on pages that are somewhat larger than the desired size (i.e., the length and width) of the finished and bound book to be produced. These books, after they are bound, are typically trimmed along three sides to the desired final dimension in a separate trimming machine. Heretofore, such operations were carried out in separate machines that required considerable adjustment to bind books of different sizes and thus were best suited for production runs of many books. In addition, both prior art binding machines and trimming machines were very expensive.

In recent years, book printing has undergone changes as computer technology and laser printers have advanced. This new technology now allows for machines capable printing perfect bound books "on-demand". This new technology is often referred to as print-on-demand (POD). Such POD printed books come in a variety of formats and thicknesses (i.e., the number of pages in the book). Note that the terms "printing-on-demand" and "print-on-demand" are generally utilized interchangeably and refer to the same acronym "POD".

One example of a print-on-demand (POD) system is disclosed in U.S. Pat. No. 5,995,721, "Distributed Printing System," which issued to Rourke et al. on Nov. 30, 1999. U.S. Pat. No. 5,995,721 generally discloses document processing system including at least one document reproduction apparatus and managing on-demand output of a document job. The document job is characterized by a set of job attributes with each job attribute relating to a manner in which the document job is to be processed by the document processing system. The document processing system, which further includes a document server for managing conversion of the document job into the on-demand output, includes: a plurality of queues mapped to a plurality of document processing subsystems, each of the plurality of queues including a set of queue attributes characterizing the extent to which each document processing subsystem mapped to one or more of the plurality of queues is capable of processing a job portion delivered to the one or more queues.

Another example of a print-on-demand system is disclosed U.S. Pat. No. 5,832,193, "Method and apparatus for printing a label on the spine of a bound document," which issued to Perine et al on Nov. 3, 1998. U.S. Pat. No. 5,832,193 generally describes a printing system for printing a representation of an image on a first portion of a bound document with the image being disposed on a second portion of the bound document is provided. The printing system includes an input station for generating a print job including the image, and a printing machine, communicating with the input station, for producing prints corresponding with the job, wherein one of the prints includes the image as a printed image.

The printing system of U.S. Pat. No. 5,832,193 further includes a spine printing apparatus including an image capture system for reading the printed image and converting the same to a set of image data; and a printing device for printing the representation of the image, by reference to the set of image data, on the first portion of the bound document. Note that both U.S. Pat. Nos. 5,995,721 and 5,832,193 are incorporated herein by reference. Note, however, that neither U.S. Pat. No. 5,995,721 nor U.S. Pat. No. 5,832,193 constitute essential matter. Such patents are referenced herein for general edification and background purposes only.

Books and other publications created for print-on-demand (POS) applications can therefore be mastered (i.e., run through a pre-press process), placed in a repository, and then printed, bound and trimmed when an order for the book arrives. One of the primary problems that current POD systems encounter is that color does not remain constant at each step in the workflow. While the industry has produced standards that facilitate consistent color throughout printing and other associated workflow processes, the actual applications have lagged behind in implementing such standards. As a result, the deployment of digital, on-demand printing systems, in addition to the complexity of other technologies has prevented many users from deploying correctly implementing such workflows, at least with respect to color rendering. A need thus exists for improved methods and systems for permitting the deployment of POD systems for color publishing, such as color books. An end-to-end workflow for creating and printing color books while maintaining color consistent at each step in the workflow is needed.

BRIEF SUMMARY

It is, therefore, a feature of the present invention to provide for improved print-on-demand (POD) methods and systems.

It is another feature of the present invention to provide for improved color rendering methods and systems.

It is also a feature of the present invention to provide for POD methods and systems that incorporate color rendering capabilities.

It is additionally a feature of the present invention to provide for an improved POD workflow in which color consistency is maintained through out a POD workflow.

Aspects of the present invention relate to methods and systems for maintaining color consistency in print-on-demand applications. Initially, a plurality of default color settings applicable to a plurality of print-on-demand operations can be established. Thereafter, color consistency can be selectively imposed across a plurality of print-on-demand operations based on the plurality of default color settings applicable to the plurality of print-on-demand operations. Finally, a print-on-demand media product can be rendered in response to selectively imposing color consistency across the plurality of print-on-demand operations. An end-to-end print-on-demand workflow is therefore disclosed herein that describes how to create and print color books while maintaining color consistency at each step of in the workflow.

BRIEF DESCRIPTION OF THE DRAWINGS

The accompanying figures and non-limiting examples thereof, in which like reference numerals refer to identical or functionally-similar elements throughout the separate views and which are incorporated in and form part of the specification further illustrate embodiments of the present invention.

DETAILED DESCRIPTION OF THE INVENTION

The particular values and configurations discussed in these non-limiting examples can be varied and are cited merely to illustrate embodiments of the present invention and are not intended to limit the scope of the invention.

Figure 1:
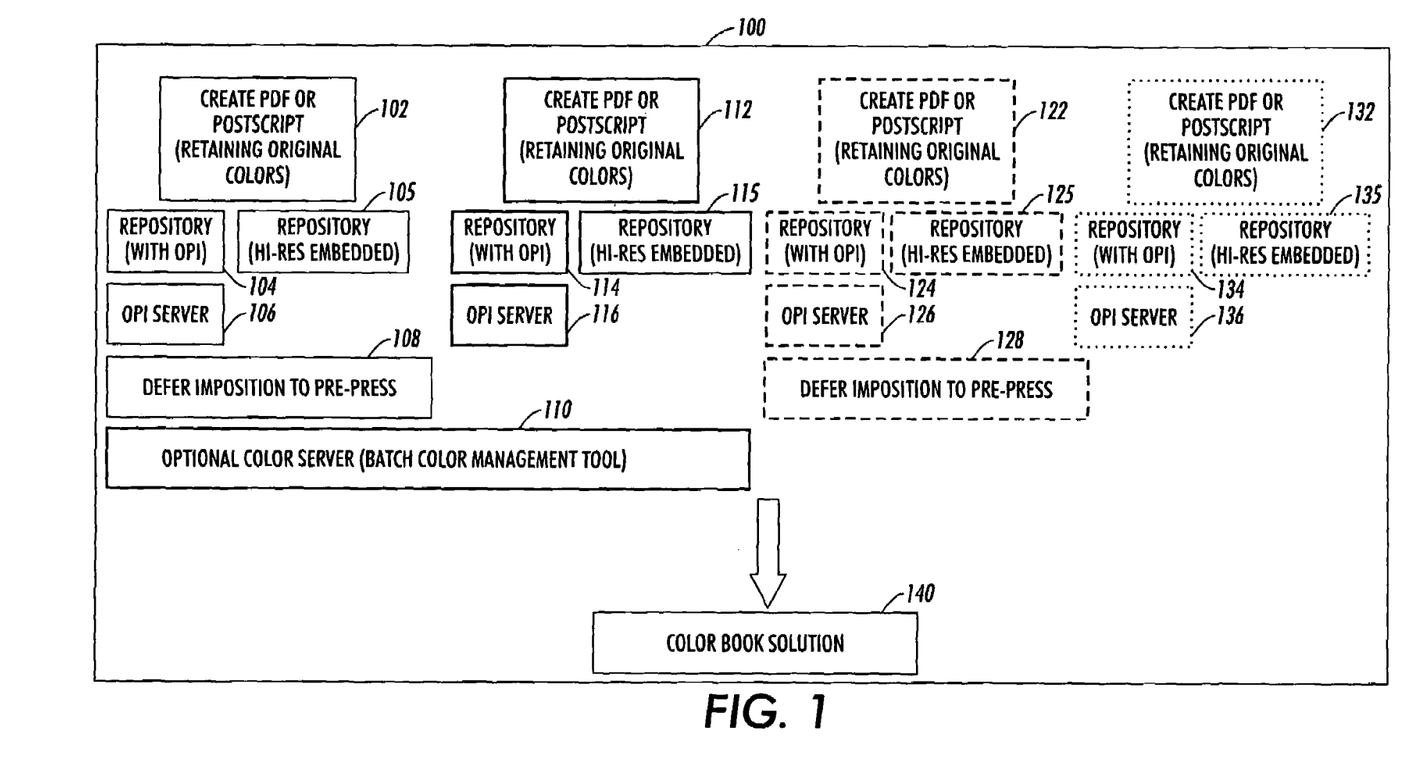
FIG. 1 illustrates a block diagram depicting digital book preparation options, which can be implemented in accordance with a preferred embodiment of the present invention.

FIG. 1 illustrates a block diagram depicting a system 100 of digital book preparation options, which can be implemented in accordance with a preferred embodiment of the present invention. System 100 depicts a variety of digital book preparation workflow options that may precede the submission of an electronically formatted book file to a color book solution preparation environment, which is indicated at block 140 of FIG. 1. Several options are thus depicted in FIG. 1, including a first option, which is represented generally by blocks 102, 104, 105, 106, and 108.

A second option is generally represented by blocks 112, 114, 115, 116, and 110. A third option is generally indicated by blocks 122, 124, 125, 126, and 128. Finally, a fourth option can be represented by blocks 132, 134, 135, and 136 of FIG. 1. System 100 is generally divided into eight columns, indicated by repository boxes 104, 105, 114, 115, 124, 125, 134, and 135, and their respective vertical workflow operational associations. Each column represents a set of operations that can be utilized to produce a book that can be manufactured via the color book solution indicated by block 140.

Note that color images are commonly represented as one or more separations, each separation comprising a set of color density signals for a single primary or secondary color. Color density signals are commonly represented as digital pixels, which vary in magnitude from a minimum to a maximum, with a number of gradients corresponding to the bit density of the system. Thus, for example, a common 8-bit system can provide 256 shades of each primary color.

A color can therefore be considered as the combination of magnitudes of each pixel, which when viewed together present the combination color. Usually, printer signals include three subtractive primary color signals (i.e., Cyan, Magenta and Yellow) and a Black signal, which together can be considered the printer colorant signals. Each color signal forms a separation, and when combined together with the other separations forms the color image. Note that the term "CMYK" generally refers to four colors utilized in printing processes, which are cyan, magenta, yellow, and black.

The workflow in the far left column of FIG. 1 represents the creation of a book that contains original CMYK color encoding and uses OPI for which a resulting imposition is deferred. The acronym OPI generally refers to Open Prepress Interface (OPI), which is an extension of the PostScript page-description language that enables the design of pages with low-resolution images, followed by a replacement of such images with high-resolution images when printing separations. PostScript is well-known page description language developed that allows entire pages to be sent describing graphics and text to a printer. The flexibility allows more than just normal ASCII characters to be sent and is the de-facto standard in high end printing.

The second column from the left, as indicated in FIG. 1, represents the same workflow as the first column, except that this second column does not utilize OPI. As indicated at block 105, the high-resolution images are simply embedded. Note that as indicated at block 110, the use of a color server is optional. A user can either submit the book files to the color book solution (i.e., see block 140) thereby retaining the original CMYK encoding, or the user can utilize a photo shop software application or a batch color management application to transform the original CMYK encoding to a color book solution printer-specific CMYK application prior to the original submission of the book files.

The workflow in the fifth column (i.e., see block 124) represents the creation of a book that contains printer specific color encoding and uses OPI (has For Placement Only images (FPO) with links to the externally stored high-resolution images) for which the imposition has been deferred (i.e., the pages are 1-up). The sixth column (i.e., see block 125) from the left represents the same workflow as the fifth, except that it does not use OPI (i.e., the high-resolution images are embedded). The workflow in the seventh column (i.e., see block 134) represents the creation of a book that contains printer specific color encoding, and uses OPI and an imposed PDF original. The eighth column from the left (i.e., see block 135) represents the same workflow as the seventh, except that it does not use OPI (i.e., the high-resolution images are embedded).

To incorporate digital printing into an offset workflow, one must determine which digital book preparation workflow will be utilized. To accomplish this, each method, such as OPI, storage color encoding and imposition, must be evaluated for utilization with the current workflow. The columns of FIG. 1 illustrate various workflow combinations that can result. Working with the options depicted in FIG. 1, workflow processes can be identified along with the appropriate column that coincides with user selections. All of the columns can then be eliminated, except the one required. For example, if OPI is utilized, then columns 1, 3, 5 and 7 are appropriate options. If a user prefers to archive imposed book files, then either columns 3, 4, 7, or 8 should be selected. Alternatively, if a user prefers to retain the original CMYK color encoding until print run time, then columns 1, 2, 3, or 4, are appropriate choices. Only column 3 is available via all three methods. Therefore, column 3 represents the functionality of a preferred digital book preparation workflow. For the purpose of archiving (short or long term) a near-print-ready book block, a user may wish to establish an archive of book jobs that have been processed through a preferred digital book preparation workflow.

Moving from black and white digital printing to color content printing may necessitate including new processes in the printing workflow. Color files, because of their 3× to 10× file sizes (i.e., compared to similar black and white files) may require new file management processes. OPI methods can be used to improve application performance and network transmission times in printing workflows with significant high-resolution color image content. Color encoding choices for archived original files, archived near-print-ready files, and work-in-progress files must be considered in the context of customer needs, the range of targeted outputs, and long-term digital asset management strategy.

In transitioning from offset to digital, reference can be made to FIG. 1 to select a preferred workflow processes. OPI and color encoding should be considered at each point in the workflow, and the imposition utilized in the current workflow. The columns of FIG. 1 depict various workflow combinations that result. Working with the options depicted in FIG. 1, the workflow processes can be identified and the column that coincides with user selections. All columns can then be eliminated except the one required. For example, if a user determines to upgrade to utilizing OPI then columns 1, 3, 5, and 7 are appropriate options. If the user prefers to archive un-imposed book files (e.g., impose on the print path), then either columns 1, 2, 5, or 6 should be selected. If, however, the user expects to receive book files in CMYK (i.e. the original CMYK encoding), the books files should be stored in this encoding, and then converted to a printer CMYK format using a batch color management tool immediately prior to submission to the color book solution depicted in block 140. Columns 1, 2, 3, or 4 are therefore appropriate choices.

Only column 1 is present in all three aforementioned methods. Therefore, column 1 can represent the functionality of a preferred digital book preparation workflow. For the purpose of archiving (i.e., short- or long-term) a near-print-ready book block, a user may wish to establish an archive of book jobs that have been processed through the user's preferred digital book preparation workflow.

Figure 2:
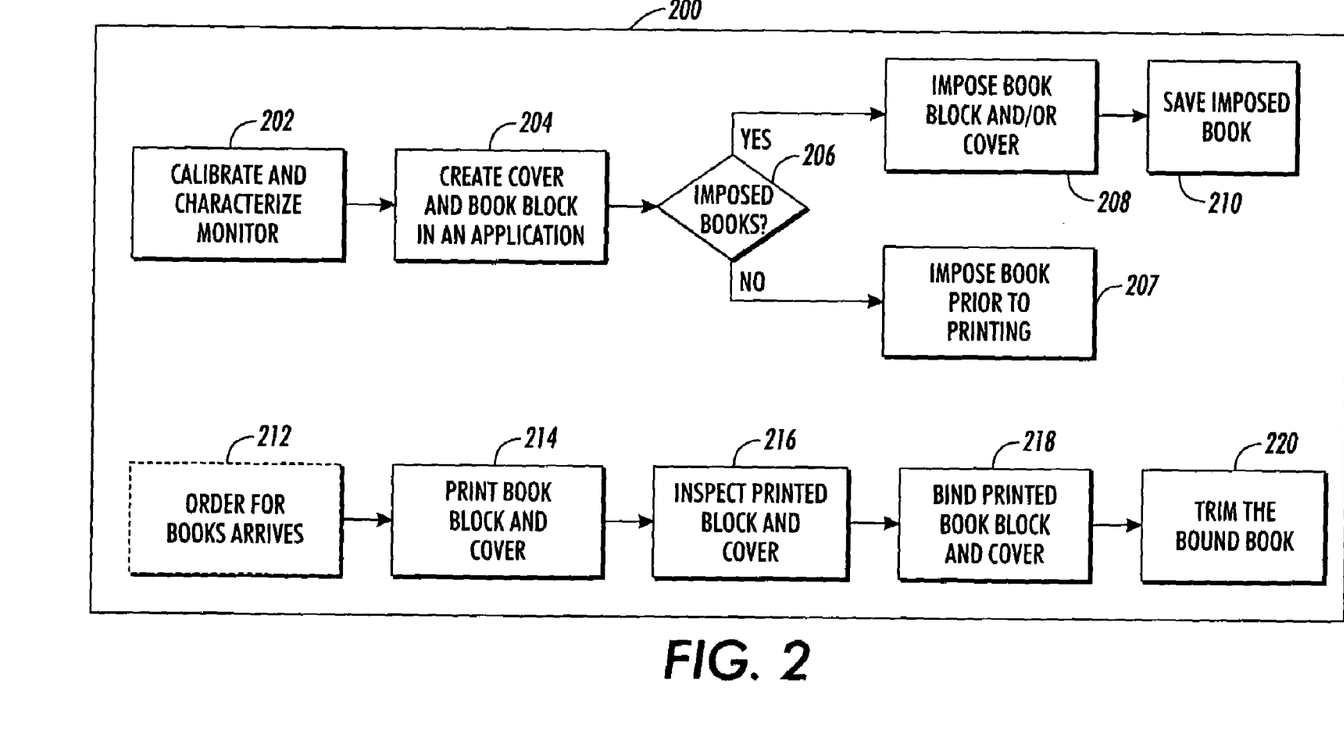
FIG. 2 illustrates an operational schematic diagram of a color book preparation system in accordance with a preferred embodiment of the present invention.

FIG. 2 illustrates an operational schematic diagram of a color book preparation system 200 in accordance with a preferred embodiment of the present invention. System 200 describes in general, an end-to-end color book workflow process. As indicated at block 202, the monitor utilized in a printing workstation should be calibrated and characterized. Note that an example of a document creation workstation intended for use with system 200 of FIG. 2 generally requires at least 256 MB RAM and should be configured with a minimum of 512 MB of virtual memory. A typical photo shop application, for example, requires approximately 128 MB. Additionally, such a workstation should be configured with at least a 20 GB local hard drive.

The workflow described herein with respect to preferred and alternative embodiments generally can accept page PDF book files (i.e., not yet imposed), with all color data encoded in a color managed CMYK format. Such a workflow also functions with high-resolution images referenced utilizing OPI commands in the PDF document itself. All fonts thereof can also be embedded. Such constraints generally correspond to the process of column 1 of FIG. 1, but or course, other configurations are possible.

Following processing of the operation depicted at block 204, a book cover and block can be created in a printing application. All images thereof can be included, for example, in TIFF or JPEG format, depending upon the desired application. If a user utilizes O PI, low-resolution TIFF images can be included in the electronic book file. High resolution TIFF images can be located in a memory location of an associated server. The entire document can be exported to PostScript from the document application. A distiller application can then be utilized to convert the PostScript file to a PDF file. Thereafter, as depicted at block 206, a test is performed to determine if an associated repository contains imposed books. If, so the book block and/or book cover can be imposed as indicated at block 208 and the imposed book saved as one or more PDF files, as depicted at block 210. If not, then as depicted at block 207, the user should plan to impose the book prior to printing thereof.

Blocks 212–220 of system 200 generally describe the actual printing process. As indicated initially at block 212, the actual order for the book can arrive at the printshop and thereafter, as indicated at block 214, the print book block and cover can be printed. Next, as depicted at block 216, the printed book block and cover can be inspected. Thereafter, as depicted at block 218, the printed book block and cover can be bound together. Finally, as indicated at block 220, the bound book can be trimmed.

Figure 3:
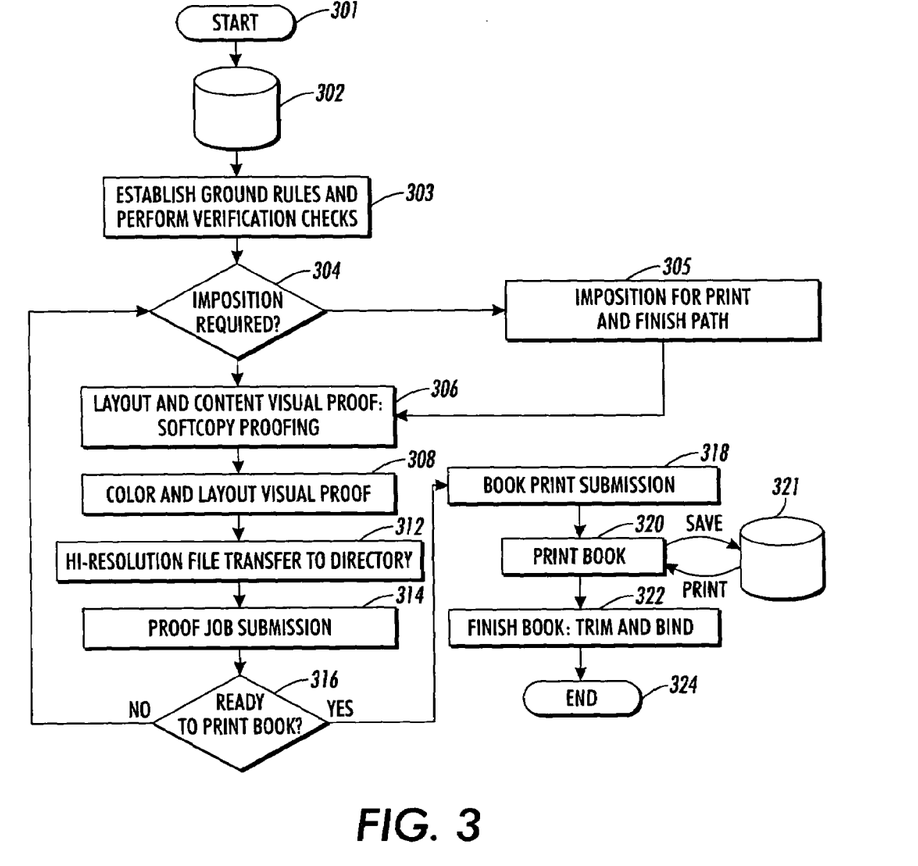
FIG. 3 illustrates a high-level flow chart depicting color book prepress and print workflow operations in accordance with a preferred embodiment of the present invention.

FIG. 3 illustrates a high-level flow chart 300 depicting color book prepress and print workflow operations in accordance with a preferred embodiment of the present invention. The process can be initiated, as indicated at block 301. A client file system 302 can provide necessary electronic data for the process depicted in FIG. 3. As described at block 303, grounds rules can be established and verification checks performed prior to continuing the prepress and print workflow operations thereof. According to the operation illustrated at block 303, an operator can perform a "preflight" verification PDF near-print ready files are formatted, fonts are embedded, high resolution images are OPI linked, and CMYK color encoding is implemented.

An example of a "preflight verification" software application which can be utilized in accordance with one embodiment herein is the "FLIGHTCHECK®" software available from Markzware, Inc., a company based in Santa Clara, Calif. "FLIGHTCHECK®" is a registered trademark of Markzware, Inc. The operation illustrated at block 303 thus generally involves establishing a default set of FLIGHTCHECK® settings, called Ground Rules, for use in the "preflighting" process. Such Ground Rules can be modified. Alternatively, specialized Ground Rules can be added over time particular issues are identified with respect to the book files that the user receives.

Following processing of the operation illustrated at block 303, a test can be performed to determine if an imposition is necessary, as indicated at block 304. Such a test can actually be automatically performed via software applications or can be initiated at the behest of the operator. If an imposition is required, then as illustrated at block 305, an imposition is performed for the print and finishing path. The operation depicted at block 306 can then be processed. If, however, an imposition is not required, then the operation illustrated at block 306 is processed immediately after the operation depicted at block 304. According to the operation illustrated at block 306, layout and content visual proofing can occur (i.e., softcopy proofing). Such a proofing operation, however, is not for color. An operator may utilize an application such as Adobe Acrobat 4.0 for the layout and content visual proofing operation depicted at block 306.

Thereafter, as depicted at block 308, a color and layout visual proof operation can be implemented. Block 308 generally refers to hardcopy proofing of representative pages, the book block, the book cover and so forth. An operator can select color-proofing elements utilizing an application such as Adobe Acrobat 4.0. Next, as indicated at block 312, a high resolution image file transfer operation to an OPI directory can be implemented. If the book PDF's contain OPI high-resolution image links, all of the high-resolution images can also be transferred to the OPI directory. Thereafter, as indicate at block 314, the actual job submission should be proofed. Color book proof jobs can be submitted via Windows-based personal computer or a Macintosh computer. The operator can submit selected pages, the entire book, and/or the book cover utilizing applications such as Adobe Acrobat 4.0 and a an Adobe Printer Driver or simply via a "Print" icon of a printing application.

Following processing of the operation depicted at block 314, another test can be implemented, as indicated at block 316. An operator decision can determine whether or not the book is ready to print. If the book is not ready to print, then the processes beginning at block 306 are repeated. If, however, the book is ready to print, then as indicated at block 318, the book print is actually submitted. Color book jobs can be submitted from client workstations, personal computers, Macintosh computers, and the like. The operator can perform the operation depicted at block 318 utilizing submission path parameters as defined during a prior proofing step. Note that the color book media for the book block and covers should be validated. Offline processes for validation can include, for example, validating the physical quality of media through printing and finishing, as well as customizing color tables as required in order to adjust for media white point.

Next, as indicated at block 320, the book can actually be printed. The book can be stored electronically in its final format within a network file system of a database 321 and later re-printed as many times as necessary. Finally, as indicated at block 322, the book can be trimmed and bound. The process can then terminate as depicted at block 324.

In general, color output results are affected by conditions across the entire creation-to-print workflow. There are seven key Color Control Factors. Color Control Factors are those elements of any capture-to-output color document system that must be addressed in order to achieve consistent color appearance—delivering stability, repeatability, and predictability in the first print and in all later prints.

The color encoding used, the color encoding identification mechanism, and any embedded or linked color transformation data such as ICC source profiles or PostScript tables all contribute to the color source specification for each document. Color source specification is dependent on document and image file formats. Many image and document formats are restricted to a limited set of color encoding definitions. Two key issues here are unidentified source document colors (which frequently occurs because document formats do not support complete color encoding identification) and suboptimally constrained source color gamut (due to constrained color processing early in the image to print workflow).

Calibration is the term used to identify the control capability supplied with each device such that the device can be maintained consistently within its optimal operating range. Each device manufacturer is responsible for providing this capability with each imaging device. The challenge here is that while calibration for each device is proprietary, any device in the workflow that is not controlled (e.g., an uncalibrated computer display) can adversely impact color results on other devices in the workflow. Note also that there is an interdependency between source device calibration and original document color specification (i.e., the source device must be calibrated and characterized if the original document color is to be specified), as well as a linkage between device calibration and characterization.

Characterization refers to the capability of measurement and modeling software, tools and procedures to represent the full range of color device behavior. The set of colors available to a device is called the device color space or device color gamut. Visualize a three-dimensional color encoding volume (e.g., a cube) in color space with medium gray at the center of the volume. The color-encoding volume, or color gamut, represents the colors that a device can interpret (e.g., a scanner) or display (e.g., a monitor or printer). Now imagine several of these color gamuts, each representing the colors that different devices can interpret (e.g., scanners, monitors, and printers do not have exactly the same color gamuts).

Each of these color-encoding volumes coincides with the others at the visually common gray center. However, each of these color-encoding volumes may be larger or smaller than another, and may have quite a different shape at its outer boundary. These differences directly affect which visual colors can be represented in each color encoding volume, and hence, which visual colors can be displayed or captured on the represented device. Fundamentally, more volume equals more colors. The relationships between the device color gamuts can impact the final printed or displayed color across any creation-to-print workflow. Colors transformed from a larger color encoding volume to a smaller color encoding volume can only be approximated in the smaller volume. The record of the original, more visually colorful encoding is lost.

Device-independent color encodings, defined through international standards (e.g., CIELAB, CIEXYZ, and the like) serve as connection points in an ICC-based or Postscript-based color management system. Other device-independent color encodings, such as Adobe RGB (i.e., 1998 version) in Photoshop 5.x and 6.0, can serve as intermediate working spaces used during the image creation and editing process. It is important to note that such RGB working spaces, although device-independent, do possess specific color gamuts, and therefore can impact the range of colors carried through a workflow.

The characterization process provides device color gamut data for use in an ICC or Postscript color management workflow. The characterization process results in the unambiguous representation of characterization data in standard data formats such as an ICC profile or a PostScript table. Characterization methods are typically proprietary, but must be compatible with the encoding requirements of the external standards. Together, calibration and characterization data tables must form the bridge between specific device colors, device-independent intermediate color encodings, and the color translation algorithms that render the document colors for display at the various stages of the workflow.

Color aim refers to the color preference of a customer. A color aim includes practices, conventions, and standards that comprise market- and geography-specific customer color print appearance preferences. Two classes of preferred color aims (i.e., also known as color expectations) can be identified based on distinct document creation processes.

In some cases, those who work with color documents create the documents on PCs or workstations and use the onscreen document appearance to determine the preferred color rendering for print. That is, the acceptability of printed output is determined by the extent to which it is perceived to match the display.

In other cases, color practitioners create color documents using their experience to mentally integrate computer display color appearance, printer color capabilities, real-world memory colors, and industry color standards, thereby establishing the preferred print color rendering. Computer display color appearance is the least important determinant for these color practitioners; the preferred rendering for hardcopy is that which matches their mental image.

Color aim practices reflect customer color print appearance preferences and are established though proprietary practices, industry conventions, and standards specific to markets and geographies.

In many cases, formal standards provide the starting point for proprietary printing aims developed within particular printing workflows, for particular customer environments. The characterization process, combined with appropriate end-to-end color management, provides the means for automating consistent delivery of preferred color print aims. When a target customer environment includes non-standard viewing conditions, those producing printed output must establish specialized aims for such conditions. Examples are prints sold in retail settings that must appeal to the consumer under in-store fluorescent lighting, and billboards or other printed materials that must hold their appeal in harsh full-sun lighting.

The color and resolution capabilities of each device determine how well that device will support the various market- and geography-specific color aim and image quality expectations. Colorant design, halftone design, color plane lay-down interactions, media design and inherent color response stability are the key contributors to device color behavior. These physical device attributes in turn constrain device capability to implement a particular color aim.

The specific DFE/printer color and resolution attributes that can affect the design of a color book include factors such as color gamut (i.e., derived from colorant spectral attributes, colorant interactions and halftone screen); ink Limit (i.e., limited by colorant interactions at high densities); and printer resolution (e.g., dpi, printer-addressable spots). Other factors include screen frequencies (e.g., lines per inch (lpi), line screens, screen rulings); gray levels per halftone cell (e.g., traditionally: [output device resolution/line screen]$^2+1$=shades of gray); minimum stroke (e.g., in a range of 0.15–0.5 points); and separation registration (e.g., in range of 1/64 inch—indicates trapping needs). Additional factors include dot range (e.g., 5–95 percent dot); dot shapes (e.g., halftone dot design); dot gain (i.e., from initial rendering to final print, typically significantly less with digital print paths); and screen angles (traditionally: offset screen angles are black at 45-135-225-315, magenta at 75-165-255-345, cyan at 105-195-285-15, and yellow at 90-180-270-0). Common usage describes such values as 45, 75, 105, and 90. A complete description, however, should include all four angles for each separation. Screen frequencies may range from 133 lpi to more than 200 lpi for commercial print work. If line screen (screen frequency), dot shape, screen angle, and related attributes have been factored into the book design, then some adjustment may be required when retargeting the book to digital printing.

Figure 4:
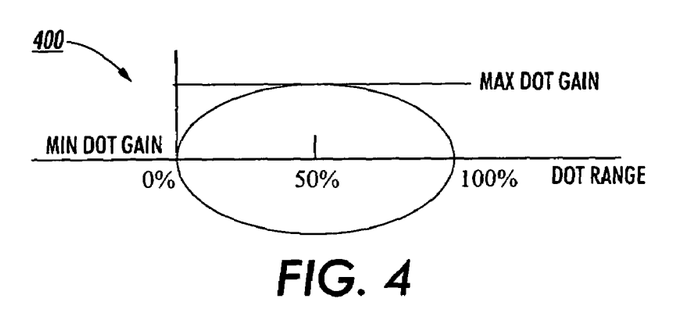
FIG. 4 illustrates a simple dot gain model in accordance with a preferred embodiment of the present invention.

FIG. 4 illustrates a simple dot gain model 400 in accordance with a preferred embodiment of the present invention. As indicated in model 400 of FIG. 4, midtone dots generally possess the longest perimeter, so they are the most affected by dot gain. Small dots possess a shorter perimeter than midtone dots. Large dots have much overlap and so also show less dot gain. In practice, the dot gain curve in a particular print path will be more complex. However, print path dot gain values are typically quoted for the 50 percent dot, with the assumption that that is the maximum dot gain. An excellent offset press can hold a 3 percent dot at either end, but still will have 5–20 percent dot gain. It is important to keep in mind that the minimum dot gain at the ends of the dot range can still be significant. A rule of thumb is that a 20 percent dot gain makes an 80 percent dot go solid. This point shows the relationship between dot gain and dot range.

Imposition is the art of laying out the finished pages of a book on the paper they will be printed on. Imposition can be as simple as placing a single page on each side of the output paper, or it can be very complex. For example, offset press impositions may have 16 images on a side in various orientations to accommodate both folding and cutting the printed sheets. The imposition utilized depends on how an operator or user intends to produce the book, including factors such as the final trim size of the book, the size of the paper upon which the book will be printed, the binder utilized, and whether barcodes will be applied to the printed book.

When imposing books for Print On Demand applications, an important decision must be made which affects costs. A user can choose impose the books prior to storing them in a Print On Demand repository, or they can be imposed later. Such a decision or test was described earlier, with respect to block 206 of FIG. 2. Imposing the book before storage in a repository is advantageous because when an order arrives for the book and to be printed immediately, the amount of time before printing begins is reduced because time is not wasted actually imposing the book.

Imposing the book prior to storage in a repository does have one main disadvantage. Understanding this disadvantage requires some preliminary explanation. Which imposition utilized depends partly on which binder plan is utilized. Binders may be designed to handle particular page image placement, paper fold, and other characteristics. If the same binder is always utilized, the same imposition can always be used. Instances may exist, however, when a different binder is required. For example, more than one binder may be available at the printing facility and one may be in use, broken, or in scheduled maintenance. Alternatively, an expanding business may outgrow existing binders or an existing binder may be worn out. Therefore, it may be necessary to purchase a new binder.

In such scenarios, the other binder utilized may not bind correctly for a selected imposition. If a book is imposed prior to storage it in a repository, then valid binding options for that imposed book are limited. Therefore, if at any time more than one kind of binder is utilized in a book manufacturing operation, imposing the book after an order arrives may enable one to more accurately determine which imposition to utilize.

Figure 5:
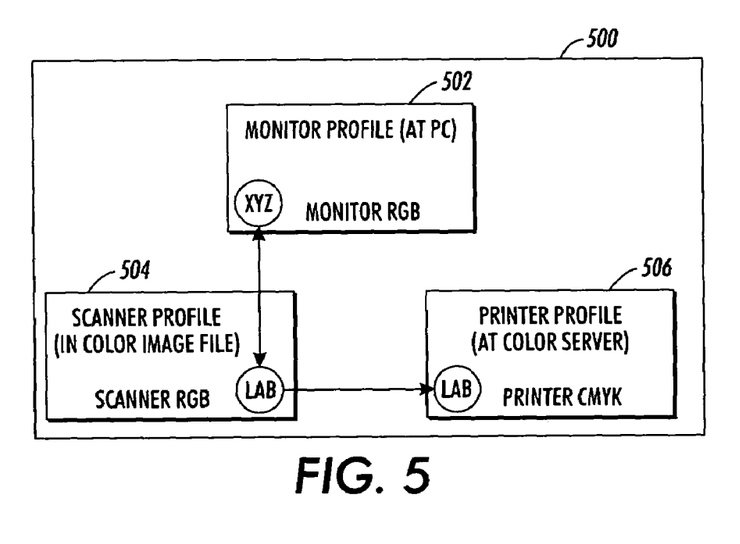
FIG. 5 illustrates a block diagram of a color profile usage system in accordance with a preferred embodiment of the present invention.

FIG. 5 illustrates a schematic diagram of a system 500 of color profile usage in accordance with a preferred embodiment of the present invention. Because of the importance of color in the printing industry, a group of companies referred to as the International Color Consortium® (ICC) have established a standard data format, called an ICC profile, to enable the exchange of characterization data through color imaging and printing workflows.

Scanners, monitors and printers do not use exactly the same set of colors. Therefore, colors from a single original can vary significantly when captured or displayed on the different devices. An ICC profile is a data file that maps the set of colors of one device (i.e., capture or print condition) to a standard set of colors that a color management module (such as a color processing software module) can interpret. A color management module (CMM) can utilize a sequence of ICC profiles to map the colors of one device into the colors of any other device. This mapping enables each device to display colors appropriately, so that the colors look the same to the observer as an image moves between devices in a workflow. The process used to build an ICC profile is called characterization.

FIG. 5 therefore illustrates a schematic diagram of how ICC color profiles are used. In the diagram, Monitor RGB, Scanner RGB, and Printer CMYK are device-dependent color spaces. CIELAB is a standard, device-independent color space that is used as an intermediary between various device-dependent color spaces (e.g., intermediate color space is known as a Profile Connection Space, or PCS). CIEXYZ is another such PCS color space. An ICC profile maps each possible device-dependent color to a color in the PCS (e.g., LAB or XYZ) color space.

Typical use of ICC profiles in a workflow might proceed this way: an image is scanned as Scanner RGB and stored in a TIFF image file that also contains an ICC Scanner RGB Profile. When the image is imported into, for example, a Photoshop 6.0 application, to display the image on the monitor, the Photoshop application can convert the LAB color values produced through the scanner RGB profile into Monitor RGB values by using the XYZ to Monitor RGB map in the Monitor Profile (i.e., Photoshop uses a standard algorithm to convert CIELAB to CIEXYZ). In this way, the monitor can display colors as they were meant to appear in the original scanned image (i.e., albeit within the physical limits of the monitor device color gamut).

In addition, any color editing operations the user performs will tend to be accurate since the user will be seeing the color accurately. Such a mapping to display operation does not change the original Scanner RGB of the image. Similarly, when the file is prepared for printing, the LAB color values produced through the Scanner Profile are converted into Printer CMYK values by using the LAB to Printer CMYK map in the Printer Profile. In this manner, the printer can print colors as they were meant to appear in the original scanned image.

Characterization creates an ICC profile for a print condition (such as a particular device, paper stock, screening method or paper color). As shown above, when an ICC profile is built for each device in a workflow, the profiles help translate color definitions among the devices so that available colors scanned, displayed or printed appear the same between those devices. Characterization creates a bridge between image input methods and image-printing methods, enabling various printers and Digital Front Ends to correctly reproduce an original image. Performing a characterization operation requires more training than performing a calibration operation therefore it is recommended that a skilled operator perform characterization. Blocks 502, 504 and 506 generally indicate the aforementioned color profile usage operations.

Figure 6:
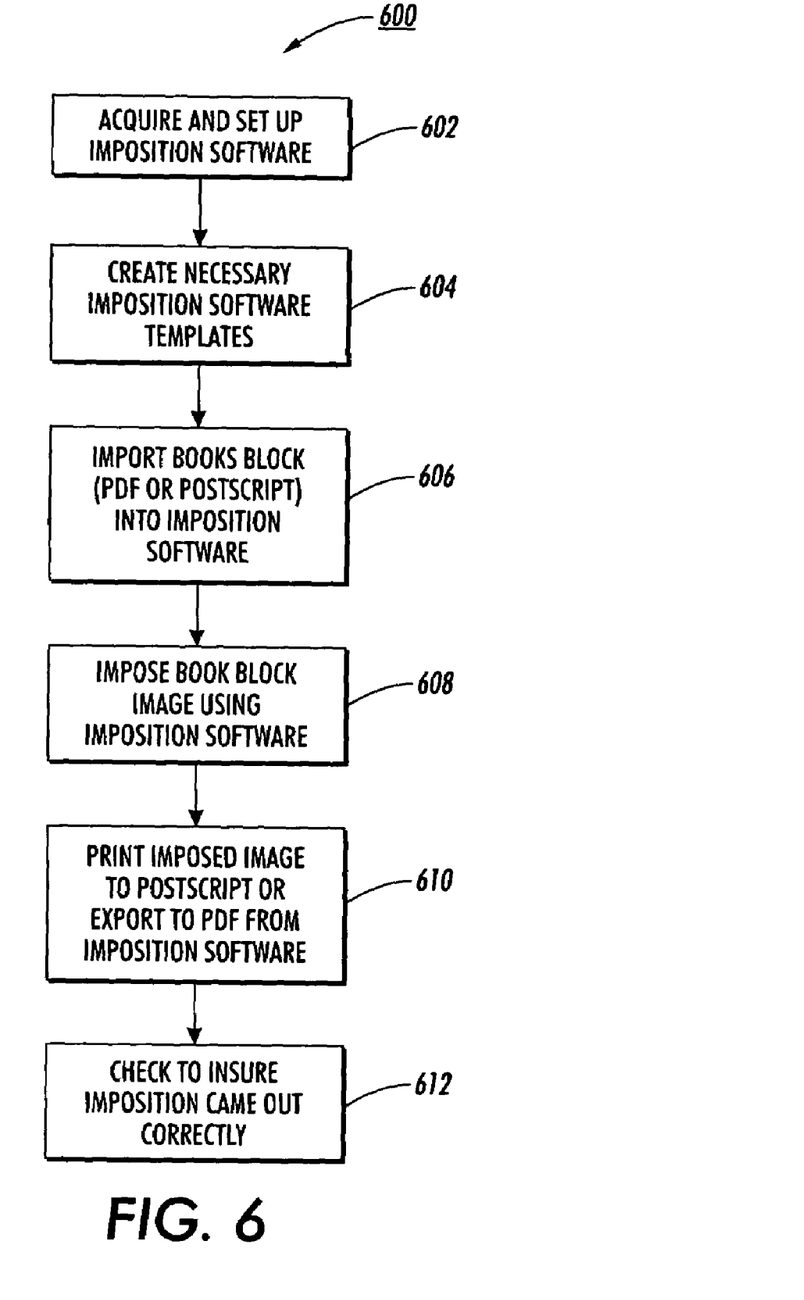
FIG. 6 illustrates a high-level flow chart depicting an imposition workflow in accordance with a preferred embodiment of the present invention.

FIG. 6 illustrates a high-level flow chart 600 depicting an imposition workflow in accordance with a preferred embodiment of the present invention. As indicated at block 602, electronic data relative to a publication (e.g., a book) can be acquired and set-up preparations implemented via an imposition software application. All high-end imposition applications require users to create templates to define their impositions. A non-limiting example of an imposition software application which can be adapted for use with an embodiment of the present invention is Creo Preps, (i.e., also referred to as "Preps").

Preps is an example of one type of imposition tool utilized in the commercial printing industry that permits a user to impose any combination of, for example, PostScript®, PDF, EPS, DCS, and TIFF source files into signatures, thereby eliminating the need for manual stripping. Such imposed signatures can be output to any PostScript-compatible device such as a CTP device, an image setter, on-demand printer, digital printer, wide format imposition proofer, or a laser printer. Creo Preps is a product of Creo, a company based in Burnaby, British Columbia, Canada. Note that the use of the "Preps" application is not considered a limiting feature of the methods and systems disclosed herein. Rather, such an application is referenced herein for general edification and illustrative purposes only.

Following process of the acquisition and imposition software set-up operation depicted at block 604, imposition templates can be created. Thereafter, as indicated at block 606, a book block (e.g., PostScript®, PDF, and the like) can be imported into the imposition software application. Next, as indicated at block 608, a book block image can be imposed utilizing the imposition software application. Thereafter, as illustrated at block 610, the imposed image thereof can be printed to PostScript® and/or exported to PDF format from the imposition software application. Finally, as depicted at block 612, an operation can be performed to check to insure that the resulting imposition was rendered correctly. Generally, the type of imposition required depends on the printing and binding equipment utilized. Imposition procedures displayed in FIG. 6 can be modified for various combinations of equipment.

Within the imposition software application, a template (*.tpl) file can define each specific type of imposition. A different template can be required for each final book trim size. The color book solution depicted at block 140 should supply the imposition software templates for all of required sizes and orientations. Such a solution can also provide instructions for customizing and saving new imposition software templates for any size in a supported imposition. Such solutions can include *.tpl files, which have the following naming convention: <imposition type><width>x<height>.tpl. The width and height represent the final trim size of the book and the < > symbols enclose variable information. By convention, the first number (width) always represents the horizontal axis of the finished version of the book and the second number (height) is always the vertical axis of the book. This allows the user to distinguish an imposition template as being for either a landscape or portrait book.

The following are examples of the imposition template naming convention:

1Up6x9on85x11.tpl (This represents a 6x9 1-up template on 8.5x11 paper)

2Upfor16x825.tpl (This represents a 6x8.25 2-up-for-1 template)

2Upfor255x85.tpl (This represents a 5.5x8.5 2-up-for-2 template)

BF6x9.tpl (This represents a 6x9 Book Factory template)

Figure 7:
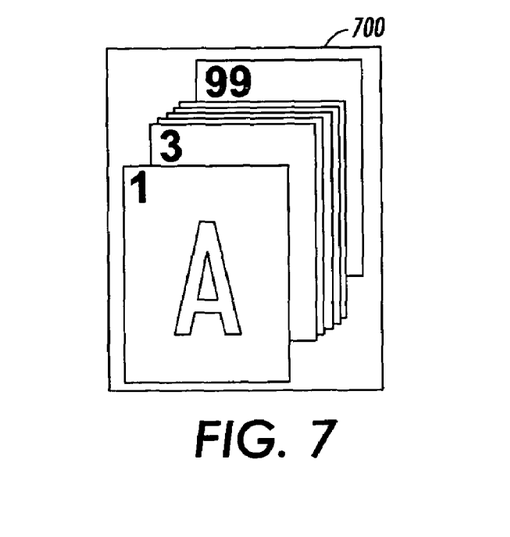
FIG. 7 illustrates a schematic diagram depicts results of applying a digital book 1-up imposition to a 100-page book in accordance with a preferred embodiment of the present invention.

In general, a 1-up imposition means that 1 image is included on each output side (2 images per sheet) and one book is produced from the imposition. Since the final book is also 1-up, the imposition is simply the process of rearranging the images so that they can be printed and bound. FIG. 7 illustrates a schematic diagram 700 that depicts the results of applying a digital book 1-up imposition to a 100-page book in accordance with a preferred embodiment of the present invention. FIG. 7 depicts the first page of a 1-up imposition of a 100-page book. The format is the same as a familiar book: one image (e.g., page 1) on the front of a sheet and the next image (e.g., page 2) with the same size, orientation and registration as the previous page on the back.

Figure 8:
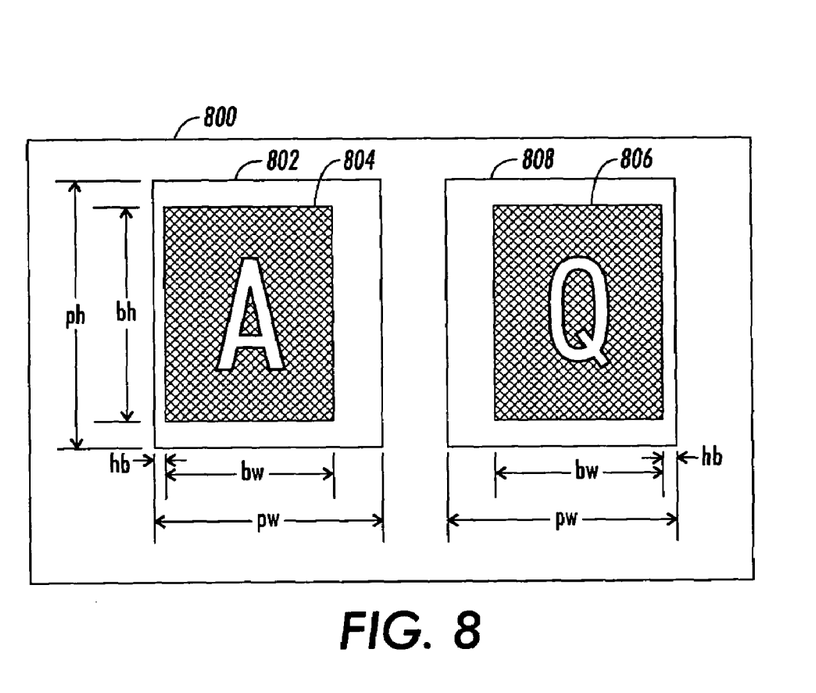
FIG. 8 illustrates a block diagram depicting the geometry of a 1-up imposition in accordance with a preferred embodiment of the present invention.

FIG. 8 illustrates a block diagram depicting the geometry 800 of a 1-up imposition in accordance with a preferred embodiment of the present invention. FIG. 8 generally depicts the 1-up imposition after the transformations have been applied. The areas marked A and Q represent the page image (e.g., text, graphics, and margins) at the finished book size. The rectangle surrounding the page images represents the paper the page images will be printed on. A and Q will be on opposite sides of the same printed sheet, in the same orientation, and with the same registration. This imposed image may be printed on a variety of page sizes depending on the application being used. Paper 802 generally indicates the paper the page image is printed upon (e.g., side 1). Page marks 804 and 806 indicate the book's page image. Paper 808 represents the paper the page image is printed on (e.g., side 2). Table 1 below defines the labeled distance parameters in FIG. 8.

TABLE 1

Distance Parameters Used in a 1-up Imposition

| Parameter | Definition |
|---|---|
| hb | Horizontal bleed. It may be zero. Used if a binder trims the paper. |
| ph | The height of the paper the book will be printed on (for example, the total height of the PostScript file declared in the BoundingBox: DSC tag). |
| pw | The width of the paper the book will be printed on (for example, the total width of the PostScript file declared in the BoundingBox: DSC tag). |
| bh | The height of the final book (final trim size). |
| bw | The width of the final book (final trim size). |

Note that the configurations depicted in FIGS. 7 and 8 represents merely one example of an imposition that can be implemented in accordance embodiments of the present invention. Other imposition configurations are possible and desirable. For example, 2-up imposition embodiments can be implemented in accordance with alternative embodiments of the present invention.

Embodiments disclosed herein thus generally describe methods and systems for maintaining color consistency in print-on-demand applications. Initially, a plurality of default color settings applicable to a plurality of print-on-demand operations can be established. Thereafter, color consistency can be selectively imposed across a plurality of print-on-demand operations based on the plurality of default color settings applicable to the plurality of print-on-demand operations. Finally, a print-on-demand media product can be rendered in response to selectively imposing color consistency across the plurality of print-on-demand operations. An end-to-end print-on-demand workflow is therefore disclosed herein that describes how to create and print color books while maintaining color consistent at each step of in the work follow.

It can be appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

The invention claimed is:

1. A method, comprising:
    initially establishing a plurality of default color settings applicable to a plurality of print-on-demand operations;
    thereafter selectively imposing color consistency across a plurality of print-on-demand operations based on said plurality of default color settings applicable to said plurality of print-on-demand operations; and
    rendering a print-on-demand media product, in response to selectively imposing color consistency across said plurality of print-on-demand operations.

2. The method of claim 1 further comprising determining if an imposition operation is necessary in response to initially establishing said plurality of default color settings applicable to said plurality of print-on-demand operations.

3. The method of claim 1 wherein selectively imposing color consistency across a plurality of print-on-demand operations based on said plurality of default color settings applicable to said plurality of print-on-demand operations, further comprises:
    selecting color-proofing elements from an electronic document to be rendered as a print-on-demand product.

4. The method of claim 1 wherein selectively imposing color consistency across a plurality of print-on-demand operations based on said plurality of default color settings applicable to said plurality of print-on-demand operations, further comprises:
analyzing an electronic document to be rendered as a print-on-demand product for high-resolution images thereof; and
if at least one high-resolution image is identified in association with said electronic document, transferring said at least one high-resolution image to a database for storage and retrieval thereof.

5. The method of claim 1 further comprising:
proofing an electronic document to be rendered as a print-on-demand product, wherein said electronic document is associated with at least one color image; and
establishing submission path parameters during proofing of said electronic document; and
thereafter automatically printing said electronic document as a hardcopy document including said at least one color image, wherein said printing is based on said submission path parameters.

6. The method of claim 5 further comprising automatically trimming and binding said hardcopy document.

7. The method of claim 1 wherein rendering a print-on-demand media product, in response to selectively imposing color consistency across said plurality of print-on-demand operations, further comprises:
printing said print-on-demand media product, wherein said print-on-demand media product comprises a book that includes a plurality of color images that match said plurality of default color settings.

8. The method of claim 7 further comprising saving said an electronic copy of said book in a network file system, wherein said electronic copy can be subsequently retrieved and said book automatically reprinted, including color images associated with said electronic copy.

9. The method of claim 1 further comprising:
identifying color images associated with an electronic document to be rendered as a print-on-demand product; and
automatically rearranging said color images so that said color images can be rendered in association with said print-on-demand product.

10. A method, comprising:
initially establishing a plurality of default color settings applicable to a plurality of print-on-demand operations;
thereafter selectively imposing color consistency across a plurality of print-on-demand operations based on said plurality of default color settings applicable to said plurality of print-on-demand operations; and
automatically proofing an electronic document to be rendered as a print-on-demand product, wherein said electronic document is associated with at least one color image; and
establishing submission path parameters during proofing of said electronic document;
thereafter rendering a print-on-demand media product, in response to selectively imposing color consistency across said plurality of print-on-demand operations, by automatically printing said electronic document as a hardcopy document including said at least one color image, wherein said printing is based on said submission path parameters.

11. A system, comprising:
a color setting module for establishing a plurality of default color settings applicable to a plurality of print-on-demand operations;
a selection module for thereafter selectively imposing color consistency across a plurality of print-on-demand operations based on said plurality of default color settings applicable to said plurality of print-on-demand operations; and
a rendering module for rendering a print-on-demand media product, in response to selectively imposing color consistency across said plurality of print-on-demand operations.

12. The system of claim 11 further comprising determining if an imposition operation is necessary in response to initially establishing said plurality of default color settings applicable to said plurality of print-on-demand operations.

13. The system of claim 11 wherein said selection module for selectively imposing color consistency across a plurality of print-on-demand operations based on said plurality of default color settings applicable to said plurality of print-on-demand operations, further comprises:
a selection module for selecting color-proofing elements from an electronic document to be rendered as a print-on-demand product.

14. The system of claim 11 wherein said selection module for selectively imposing color consistency across a plurality of print-on-demand operations based on said plurality of default color settings applicable to said plurality of print-on-demand operations, further comprises:
a module for analyzing an electronic document to be rendered as a print-on-demand product for high-resolution images thereof; and
a module for transferring at least one high-resolution image to a database for storage and retrieval thereof, if said at least one high-resolution image is identified in association with said electronic document.

15. The system of claim 11 further comprising:
an electronic document to be rendered as a print-on-demand product, wherein said electronic document is associated with at least one color image; and
a module for establishing submission path parameters during proofing of said electronic document; and
a module for automatically printing said electronic document as a hardcopy document including said at least one color image, wherein said printing is based on said submission path parameters.

16. The system of claim 15 further comprising a module for automatically trimming and binding said hardcopy document.

17. The system of claim 11 wherein said rendering module for rendering a print-on-demand media product, in response to selectively imposing color consistency across said plurality of print-on-demand operations, further comprises:
print module for printing said print-on-demand media product, wherein said print-on-demand media product comprises a book that includes a plurality of color images that match said plurality of default color settings.

18. The system of claim 17 further comprising a module for saving said an electronic copy of said book in a network file system, wherein said electronic copy can be subsequently retrieved and said book automatically reprinted, including color images associated with said electronic copy.

19. The system of claim 11 further comprising:
a module for identifying color images associated with an electronic document to be rendered as a print-on-demand product; and
a module for automatically rearranging said color images so that said color images can be rendered in association with said print-on-demand product.

20. The system of claim 11 wherein said color setting module, said selection module and said rendering module comprise a print-on-demand module comprising signal bearing media storable within a memory location of a computer.

* * * * *